United States Patent
Zitkowic, Jr. et al.

(10) Patent No.: US 6,550,815 B2
(45) Date of Patent: Apr. 22, 2003

(54) COAXIAL QUICK CONNECTOR

(75) Inventors: Michael T. Zitkowic, Jr., Pontiac, MI (US); Christopher R. Terry, Leonard, MI (US); Daniel H. Walker, Sylvan Lake, MI (US); Gary O. Klinger, Rochester Hills, MI (US)

(73) Assignee: ITT Manufacturing Enterprises, Inc., DE (US)

( * ) Notice: Subject to any disclaimer, the term of this patent is extended or adjusted under 35 U.S.C. 154(b) by 0 days.

(21) Appl. No.: 09/929,643

(22) Filed: Aug. 14, 2001

(65) Prior Publication Data

US 2003/0034648 A1 Feb. 20, 2003

(51) Int. Cl.⁷ ................................................ F16L 39/00
(52) U.S. Cl. ................................ 285/120.1; 285/123.1; 285/125.1; 285/305; 285/319; 285/921
(58) Field of Search ........................... 285/120.1, 123.1, 285/123.15, 125.1

(56) References Cited

U.S. PATENT DOCUMENTS

| | | | |
|---|---|---|---|
| 3,980,112 A | * | 9/1976 | Basham ....................... 141/392 |
| 3,986,732 A | * | 10/1976 | Stanley ....................... 285/134 |
| 4,423,892 A | | 1/1984 | Bartholomew |
| 4,978,148 A | | 12/1990 | Kosugi et al. |
| 5,156,191 A | | 10/1992 | Walker et al. |
| 5,203,384 A | | 4/1993 | Hansen |
| 5,401,064 A | * | 3/1995 | Guest ....................... 285/133.1 |
| 5,427,419 A | * | 6/1995 | Frey et al. ................ 285/133.1 |
| 5,542,716 A | | 8/1996 | Szabo |
| 5,628,532 A | | 5/1997 | Ashcroft |
| 5,730,481 A | | 3/1998 | Szabo et al. |
| 5,782,502 A | | 7/1998 | Lewis |
| 5,863,077 A | | 1/1999 | Szabo et al. |
| 5,951,063 A | | 9/1999 | Szabo |

* cited by examiner

Primary Examiner—Lynne H. Browne
Assistant Examiner—Giovanna Collins
(74) Attorney, Agent, or Firm—Young & Basile, P.C.

(57) ABSTRACT

A quick connect body having first, second and third ports carries an insert extending from the first port to the third port and forming first and second flow paths through the body from the first and second ports, respectively, to concentrically mounted conduits attached to the third port and to one end of the insert. Retainer elements are mounted on the body and/or the insert to sealingly couple first and second conduits to the body and the insert.

16 Claims, 6 Drawing Sheets

COAXIAL QUICK CONNECTOR

BACKGROUND

The present invention relates, in general, to fluid flow systems in which conduits or tubular members are interconnected in fluid flow communication with fluid operative devices or other fluid conduits by means of releasable quick connectors.

Snap-fit or quick connectors are employed in a wide range of applications, particularly for joining fluid carrying conduits in automotive and industrial applications. In a typical quick connector with an axially displaceable retainer, the retainer is fixedly mounted within a bore in a housing of a female connector component or element. The retainer has a plurality of radially and angularly extending legs which extend inwardly toward the axial center line of the bore in the housing. A tube or male fitting to be sealingly mounted in the bore in the female component includes a radially upset portion or flange which abuts an inner peripheral surface of the retainer legs. Seal and spacer members as well as a bearing or top hat are typically mounted in the bore ahead of the retainer to form a seal between the housing and the male fitting when the male fitting is lockingly engaged by the retainer legs in the female component.

Radially displaceable retainers in which the retainer is radially displaceable through aligned bores or apertures formed transversely to the main through bore in the female component or housing are also known. The radially displaceable retainer is typically provided with a pair of depending legs which are sized and positioned to slip behind the radially upset portion or flange on the male fitting only when the male fitting or conduit is fully seated in the bore in the female connector. This ensures a positive locking engagement of the conduit with the female connector as the displaceable retainer can be fully inserted into the female connector only when the male fitting or conduit has been fully inserted into the bore in the female connector.

Regardless of the type of retainer, the female housing or component portion of a fluid connector typically includes an elongated stem having one or more annular barbs spaced from a first end. The barbs provide secure engagement with a hose or conduit which is forced over the barbs to connect the female housing with one end of the conduit.

In an effort to lower hydrocarbon emissions in today's vehicles, vehicle fuel systems are typically provided with a fuel vapor recovery conduit connected between the engine and a fuel vapor recovery canister which receives unburned fuel vapors from the engine vehicle fuel injection system. This fuel vapor conduit, as it is in addition to the fuel conduit itself, represents another conduit which must be coupled at opposite ends to the fuel tank and the vapor canister as well as clipped in mounting positions along the underside of the vehicle. Both of these conduits are typically mounted on the underbody of the vehicle and thereby exposed to rocks or impingement with other objects which could lead to damage and/or rupture.

In addition, considerable effort has been made to prevent permeation of the fuel and/or vapors from conduits to the atmosphere. This has lead to multiple layer conductors wherein each layer can be formed of a different material to address fuel carrying, permeation, static charge, etc., characteristics.

All of these design efforts have lead to complications in the design, assembly and reliable use of a vehicle fuel system. Thus, it would be desirable to provide a quick connect apparatus which can minimize the number of separate components is a fluid system. It would also be desirable to provide a quick connect apparatus which can be advantageously employed in vehicle fuel systems to minimize permeation of fuel from vehicle fuel or vapor carrying conduits. It would also be desirable to provide a coaxial quick connect apparatus which facilitates quick assembly of fluid system components.

SUMMARY

The present invention is a coaxial quick connect apparatus which may be advantageously employed to conduct multiple fluids from diverse sources to a common location.

In one aspect, the invention is a connector for connecting first and second conduits to third and forth coaxial conduits. The connector includes a body defining at least first, second and third ports, first and second bores extending respectively from the first and second ports, and an insert carried in the body and defining first and second flow paths through the third port of the body. The insert fluidically couples the first port to the first flow path and the second port to the second outlet flow path.

In a specific implementation, the insert is in the form of a tubular body having a through bore defining a flow path from the first port formed at one end of the insert to the second outlet flow path through the third port of the body. A plurality of ribs are carried on the insert for concentrically mounting the insert within the first bore in the body. The insert is sealing coupled to the body to isolate the first outlet flow path from the second outlet flow path.

Retainers are releasably mounted in the connector body and/or the insert to latchingly couple the first and second conduits to the body. Preferably the retainers are releasably mountable in a temporary storage position on the connector body and/or on the insert for mounting prior to insertion of the first and second conduits into the body.

In another aspect of the invention, the connector is in the form of a body defining first, second and third apertures. First and second bores extend respectively from the first and second apertures through the body. A tubular member is mounted in the body and has a first end defining a first port and a second end extendable through the third aperture in the body. The tubular member forms concentric flow paths through the third aperture of the body from the first and second apertures, respectively, to the third and forth coaxial conduits, respectively.

Preferably, the tubular member includes a second end extending outwardly from the third aperture in the body and at least one mounting member carried on the body adjacent to the third aperture and at least one mounting member carried on the tubular member adjacent to the second end for concentrically receiving the third and forth fluid flow conduits.

The tubular member preferably includes a through bore defining a flow path from the first aperture formed at one end of the body to the second outlet flow path at the third aperture of the body. A plurality of ribs are carried on the body for concentrically mounting the tubular member in the body.

The coaxial quick connector of the present invention uniquely provides a quick connect apparatus which minimizes the number of separate components used to connect multiple components in a fluid flow system. The present coaxial quick connect finds particular advantageous use in a vehicle fuel system where the concentric flow conduits, with liquid fuel disposed to flow through the inner conduit, providing a vapor collection flow path though the outer conduit for vapors permeating through the inner conduit.

BRIEF DESCRIPTION OF THE DRAWING

The various features, advantages and other uses of the present invention will become more apparent by referring to the following detailed description and drawing in which.

DETAILED DESCRIPTION

Refer now to FIGS. 1–6 of the drawing, there is depicted a coaxial quick connect 10 designed for fluidically coupling first and second conduits 12 and 14, respectively, to concentrically disposed third and fourth conduits 16 and 18, respectively.

The term "conduit" or "conduits" is meant to include any form of tubular member designed to carry fluids, such as liquids, air, etc. The conduits 12, 14, 16 and 18 may be formed of a variety of materials depending upon the particular application in which the coaxial quick connect 10 is used. For example, any or all of the conduits 12, 14, 16 and 18 may be formed of metal, plastic, in either rigid or flexible form, and of different materials. The term "conduits" also includes end forms having a tip end and an annular, enlarged bead or flange spaced from the tip end. An opposite end of the end form is typically formed with barbs for secure attachment to a hose or conduit.

Further, although the following description of the operation of the coaxial quick connect 10 designates the first and second conduits 12 and 14 as inlet or input conduits and the third and fourth conduits 16 and 18 as outlet or output conduits, it will be understood that this is by way of example only as the function of the conduits can be reversed, with the third and fourth conduits 16 and 18 acting as inlet conduits and the first and second conduits 12 and 14 acting as outlet conduits for fluid flow through the coaxial quick connect 10.

Figure 1:
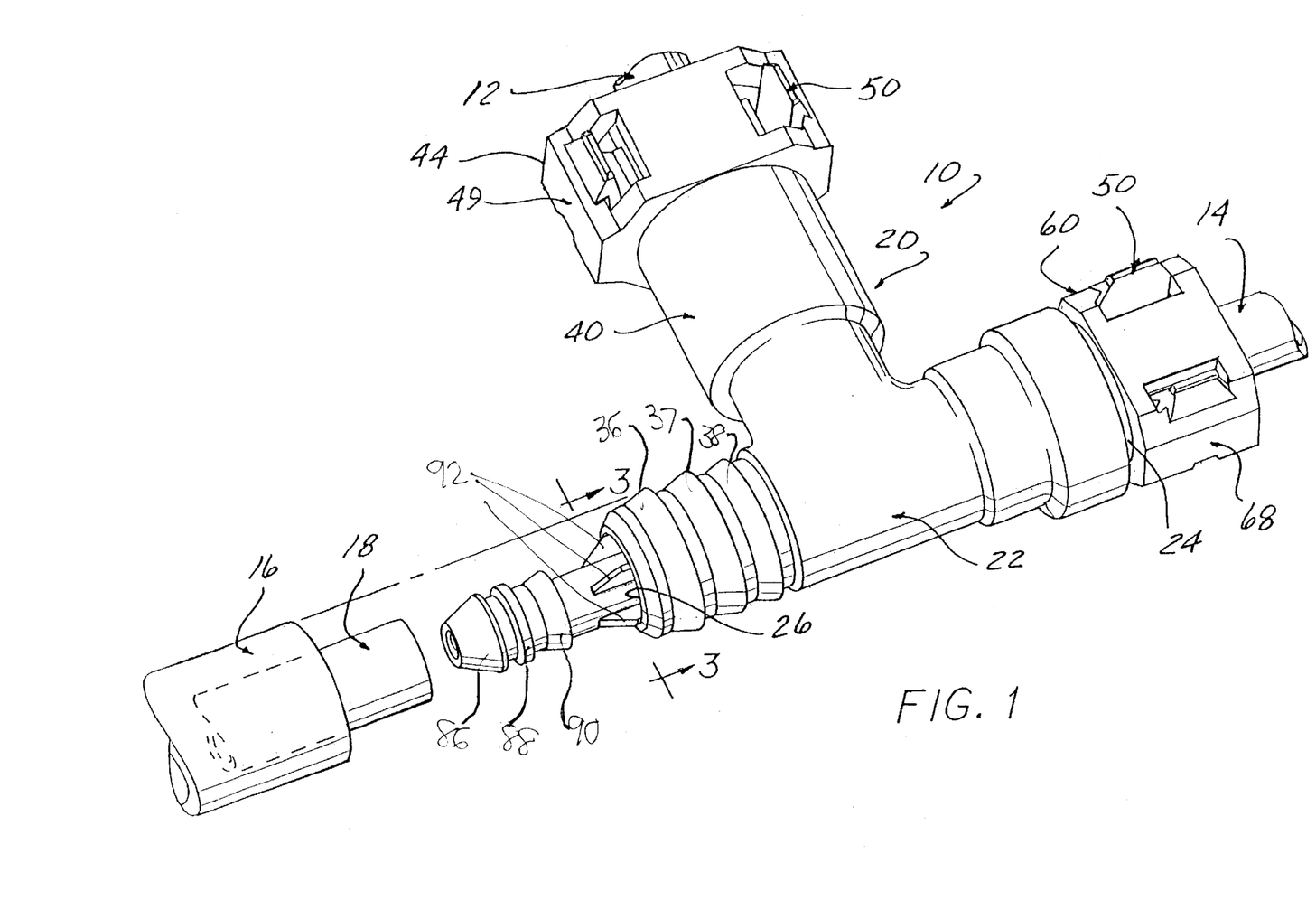
FIG. 1 is an exploded, perspective view of an assembled coaxial quick connect according to the present invention.
Figure 2:
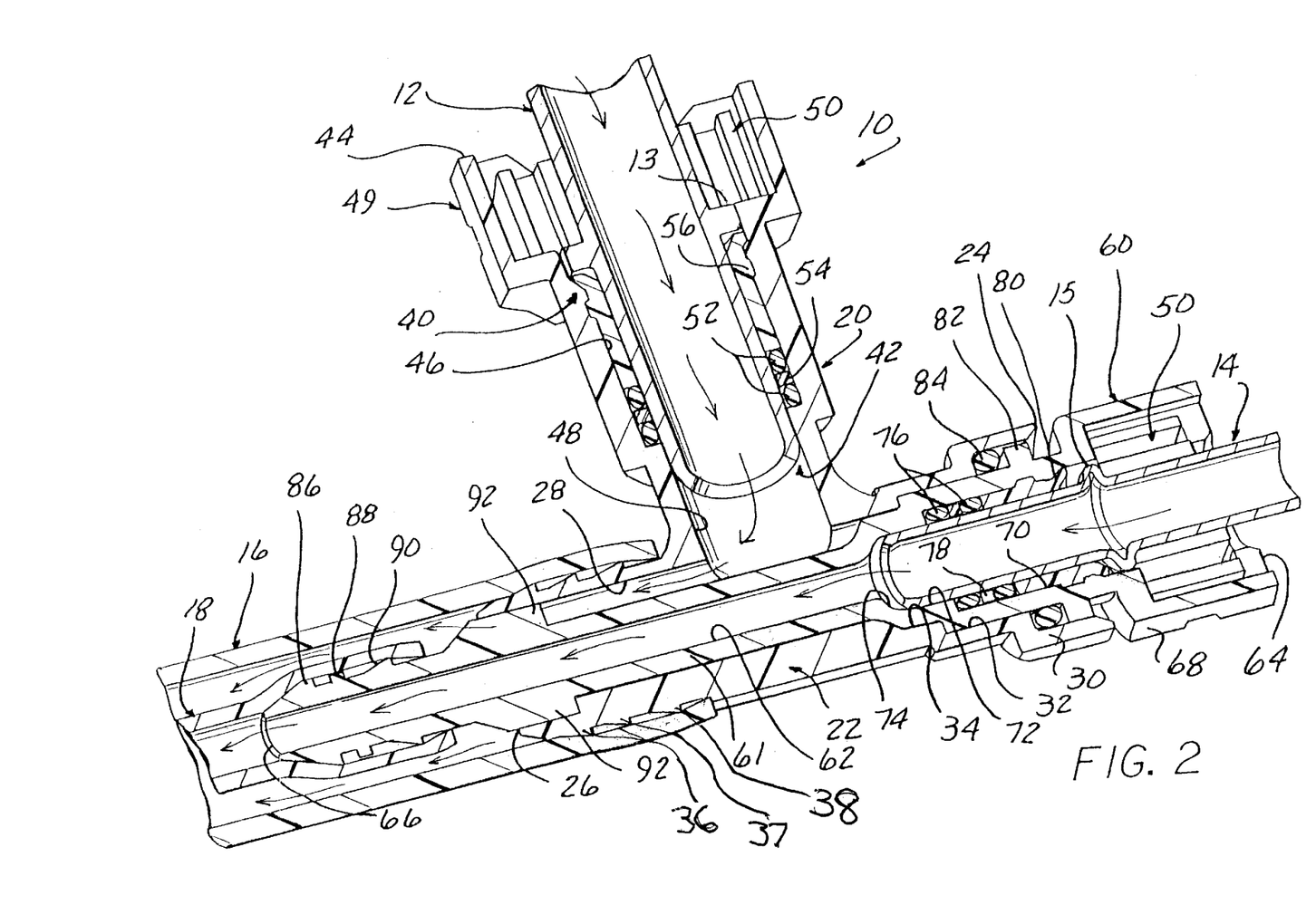
FIG. 2 is a cross-sectional view through the coaxial quick connect shown in FIG. 1.
Figure 3:
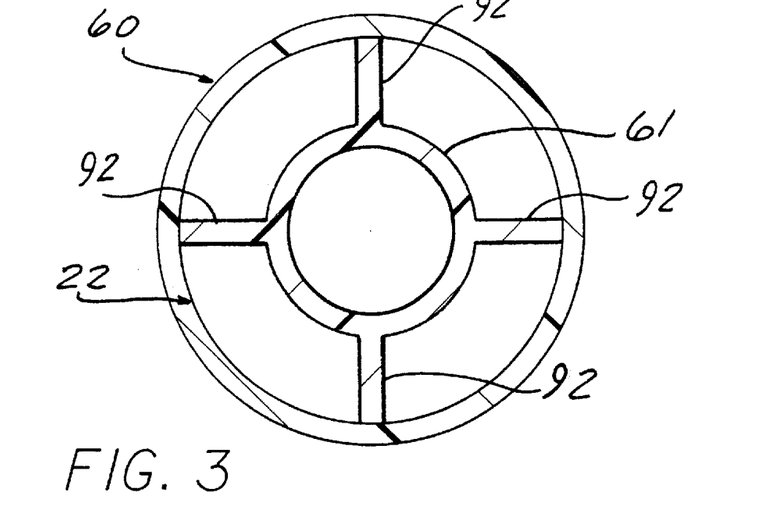
FIG. 3 is a cross-sectional view generally taken along line 3—3 in FIG. 1.
Figure 4:
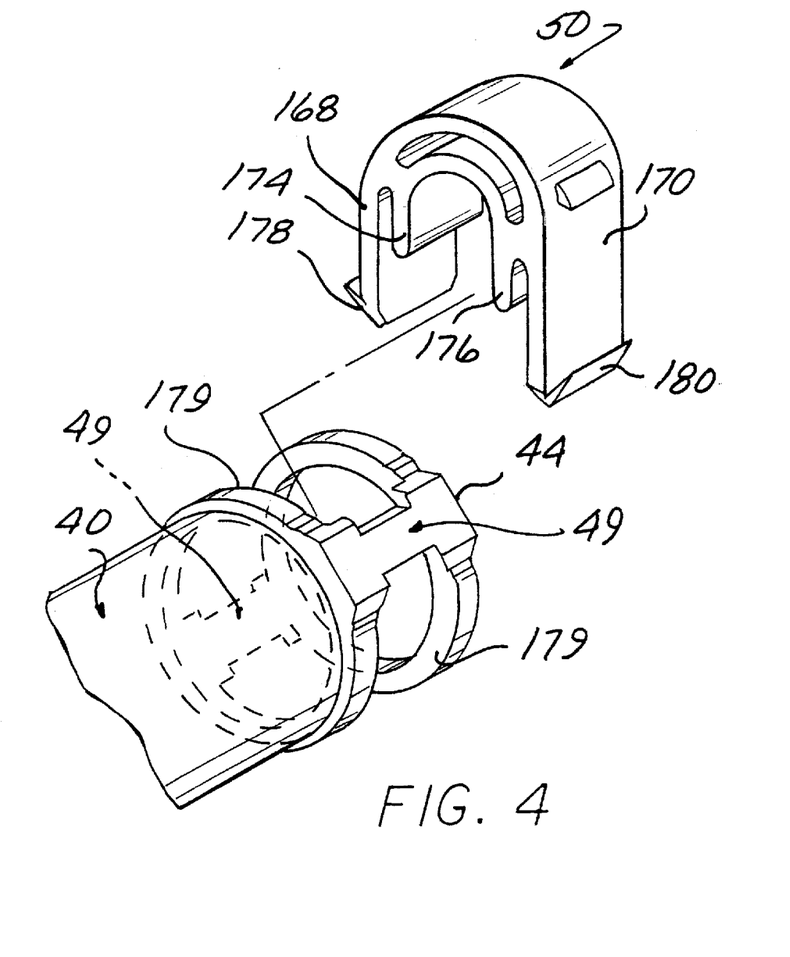
FIG. 4 is a partial, enlarged, perspective view of a retainer employed in the coaxial quick connect shown in FIGS. 1 and 2.

As shown in FIGS. 1–3, the coaxial quick connect 10 includes a housing denoted generally by reference number 20. The component parts of the housing 20, as described hereafter, can be integrally and unitarily formed as a one piece body by molding, machining, etc., as shown in FIGS. 1 and 2, or as separate components which are joined together by means of welding, adhesives, and/or mechanical fasteners. Thus, in one aspect of the invention, the housing 20 is formed as a one-piece body, typically by molding from a variety of different materials, such as glass filled nylon, by example only.

Whether or not the housing 20 is formed of one or more separate components which are sealingly joined together, the housing 20 includes a first generally tubular portion 22 having opposed first and second ends 24 and 26, respectively. A bore 28 extends between open ends or ports at the first and second ends 24 and 26 of the first tubular portion 22. A first end portion of the bore 28 adjacent and extending axially from the first end 24 of the first tubular portion 22 has a stepped configuration formed of a first, largest diameter bore portion 30, a second smaller diameter, intermediate bore portion 32 and a third, yet smaller diameter bore portion 34. The first, second and third bore portions 30, 32 and 34 are arranged axially from the first end 24 of the first tubular portion 22 and communicate with the rest of the through bore 28 extending through the first tubular portion 22 to the second end 26.

The second end 26 of the first tubular portion 22 includes at least one and preferably a plurality of annular barbs or tubular retention elements 36, 37 and 38 which are arranged in an axially spaced manner from the second end 26. The retention elements 36, 37 and 38 slidably receive the outer third conduit 16 causing a slight radial expansion of the end portion of the third conduit 16 to enable the third conduit 16 to securely grip the retention elements 36, 37 and 38 and remain securely attached to the second end 26 of the first tubular portion 22 of the housing 20.

A second tubular portion 40 is connected to the first tubular portion 22 at any location, typically between the first and second ends 24 and 26 of the first tubular portion 22 as shown in FIGS. 1 and 2. The second tubular portion 40 also has a through bore 42 extending from an opening or port at a first outer end 44 to an opening or port at an opposed end integrally connected with the first tubular portion 22. The through bore 42 intersects and fluidly communicates with the through bore 28 in the first tubular portion 22.

The first end 44 of the second tubular portion 40 has a stepped configuration formed of a first larger diameter portion 46 and a second smaller diameter portion 48 extending axially therefrom to the first tubular portion 22 as shown in FIG. 2.

The first diameter portion 46 of the second tubular portion 40 extending from the first end 44 has an enlarged shape for receiving a retainer 50 which functions to removably latch the first conduit 12 in a sealing manner in the bore 42. Further details concerning the construction of the retainer 50 will be provided hereafter.

At least one and preferably a plurality seal elements including two O-rings 52 spaced on opposite sides of an intermediate annular spacer 54 are mounted in the first portion 46 of the bore 42. The seal elements 52 and the spacer 54 are held in position in the first portion 46 by means of a bushing or top hat 56 as is conventional in quick connects.

As shown in FIGS. 1 and 2, the coaxial quick connect 10 also includes an insert depicted generally by reference number 60 which is sealingly mounted in the first tubular portion 22 preferably concentrically within the bore 28. The insert 60 functions to define a first fluid flow path formed by a through bore 62 extending through the insert 60 and the first tubular portion 22 as well as providing mounting for a retainer 50 for sealingly coupling the second conduit 14 to the housing 20.

The insert 60 includes an open first end, or port 64, and an opposed open end 66. The insert 60 is formed of a suitable material, such as a plastic, for example, a glass filled nylon.

An enlargement 68 is formed on the first end 64 of the insert 60 for receiving a retainer 50, as described hereafter. A stepped bore portion is formed in the insert 60 including a first large diameter bore portion 70 extending from the first end 64, an intermediate second stepped bore portion 72 which has a diameter to slidably receive a tip end of the second conduit 14 as shown in FIG. 2, and a third stepped portion defining the main through bore 62. A shoulder 74 is formed between the second stepped bore 72 and the through bore 62 and acts an insertion stop or limit for the second conduit 14.

The second stepped bore 72 has a diameter such that an inner surface of the second stepped bore 70 is spaced from the outer surface of the second conduit 14. Seal elements, such as O-rings 76, and an intermediate spacer 78 are held in the second stepped bore 70 by a top hat 80. The top hat 80 has an outer end flange 81 which snaps into a recess formed in the insert 60 as shown in FIG. 2.

The outer surface of the insert 60 coaxial with the second stepped bore 70 includes an annular flange 82 which forms a seat for a seal element 84, such as an O-ring to sealingly couple the insert 60 to the first tubular portion 22 of the housing 20. The forward portion of the outer surface of the insert 60 is fixedly secured to the inner surface of the bore portion 32 of the first tubular portion 22 by adhesive, welding, etc.

A plurality of annular barbs such as three barbs 86, 88 and 90, for example, are spaced from the second end 66 and securely grip the inner fourth conduit 18 as shown in FIG. 2.

Before describing the assembly of the coaxial quick connect 10, the construction and mounting of the retainers 50 in the second tubular portion 40 and the insert 60 will first be described.

First, although the insert 60 has been described as including an enlarged end 68 for receiving the retainer 50, it will be understood that the insert 60 and the end of the first tubular portion 22 of the housing 20 can be modified so that the insert 60 is fixedly mountable in the first tubular portion 22 with an enlarged end portion of the first tubular portion 22 constructed for receiving the retainer 50.

Further, although the retainer 50 will be described hereafter as being in the form of a tranversally mountable retainer, axially operable retainers, such as the retainer shown in U.S. Pat. No. 5,456,500, may also be employed in the coaxial quick connect 10 with only minor modification to the retainer receiving elements of the housing 20 and/or the insert 60.

The retainer 50 is similar to the retainer shown in U.S. Pat. No. 5,730,481 in that it includes a pair of legs 168 and 170 which depend from a central bight portion 172. Inwardly extending projections or inner legs 174 and 176 have free ends movably spaced from the adjacent legs 168 and 170 and are dimensioned to slidably engage and fit around the cylindrical portion of the first conduit 12 only when the first conduit 12 is fully inserted into the second tubular portion 40. Outwardly extending projections 178 and 180 are formed on the lower portion of each leg 168 and 170 and are devised for engaging an edge of grooves 181 in the sides 182 and 183 of the second tubular portion 40 in a partially inserted, shipping position shown in FIG. 5, or a lower edge 184 of the side legs 182 and 183 in the fully inserted position shown in FIG. 6 thereby locking the first conduit 12 in the enlarged portion 49 of the second tubular portion 40.

The retainer 50 does not have an undercut forming a surface which is adapted to engage the side surface of the enlarged flange 13 on the first conduit 12 when the first conduit 12 is fully inserted into the first and second housings 142 and 28. Rather, the interior portions of the retainer 50 are substantially flush with the side edges of the legs 168 and 170. However, it will be understood that the projections 174 and 176 will still resist full insertion of the retainer 50 into the tubular portion 40 if the first conduit 12 is not fully inserted into the bore portion 46 since the enlarged flange 13 will be in an interference position with the projections 174 and 176.

Figure 5:
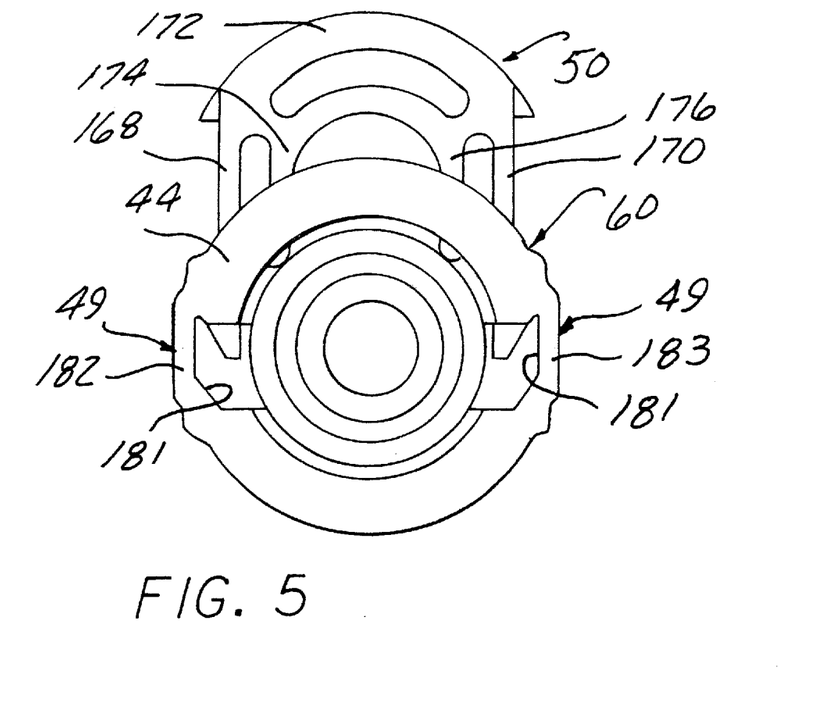
FIG. 5 is an end view showing the mounting of the retainer depicted in FIG. 4 in a partially inserted, temporary storage position in the quick connect housing.
Figure 6:
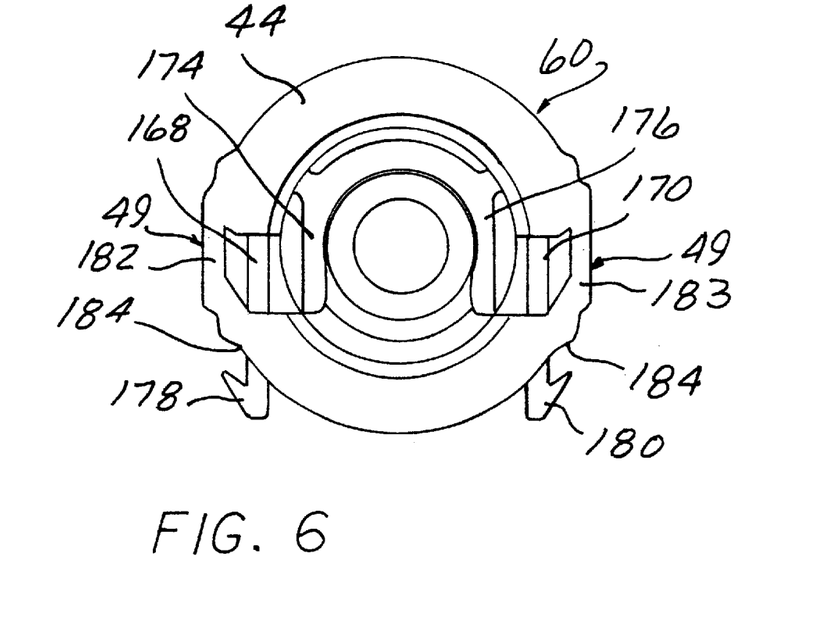
FIG. 6 is an end view showing the retainer of FIGS. 4 and 5 in a fully locked position relative to the quick connect housing.

The retainer 50 will remain in the shipping position shown in FIG. 5 during insertion of the first conduit 12 into the second tubular portion 40. Only after the first conduit 12 has been fully inserted into the second portion 40 will the retainer 50 be able to be fully inserted through the transverse aperture 179 in the second portion 40.

In use, the coaxial quick connect 10 is prepared for assembly with the first, second, third and fourth conduits 12, 14, 16 and 18, respectively, by first inserting the insert 60 into the first tubular portion 22. The insert 60 can have the seal elements 76 and the spacer 78 as well as the top hat 80 pre-mounted therein or mounted in the insert 60 after the insert 60 is fixed in the first tubular portion 22. The retainer 50 will be inserted into the temporary, storage position shown in FIG. 5 in the insert 60.

The seal elements 52 and 54 and the top hat 56 are also pre-mounted in the second tubular portion 40. The retainer 50 is also mounted in the second tubular portion 40 in the temporary storage position shown in FIG. 5.

The coaxial quick connect 10 can be shipped from the manufacturing facility of the quick connect 10 to an installation facility in this condition or having the third and fourth conduits 16 and 18 pre-mounted thereon. The third and fourth conduits 16 and 18 can be separate from any use element attached to an opposite end or pre-attached to the use element. At the final assembly site, the first and second conduits 12 and 14 are individually inserted through the open ends of the first and second tubular portions 22 and 40 until the annular beads or flanges 13 and 15, respectively, are fully inserted into the respective bores in the housing 20 to enable the retainers 50 to be moved from the temporary storage positions shown in FIG. 5 to the fully locked positions in FIG. 6.

Figure 7:
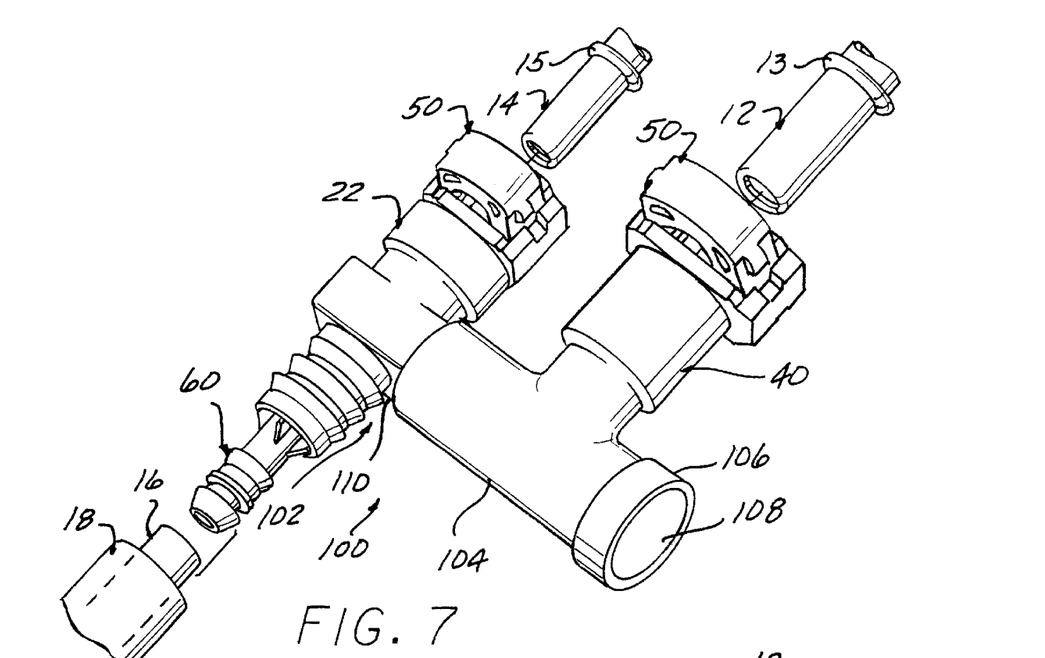
FIG. 7 is an exploded, perspective view of another aspect of a coaxial quick connect according to the present invention.
Figure 8:
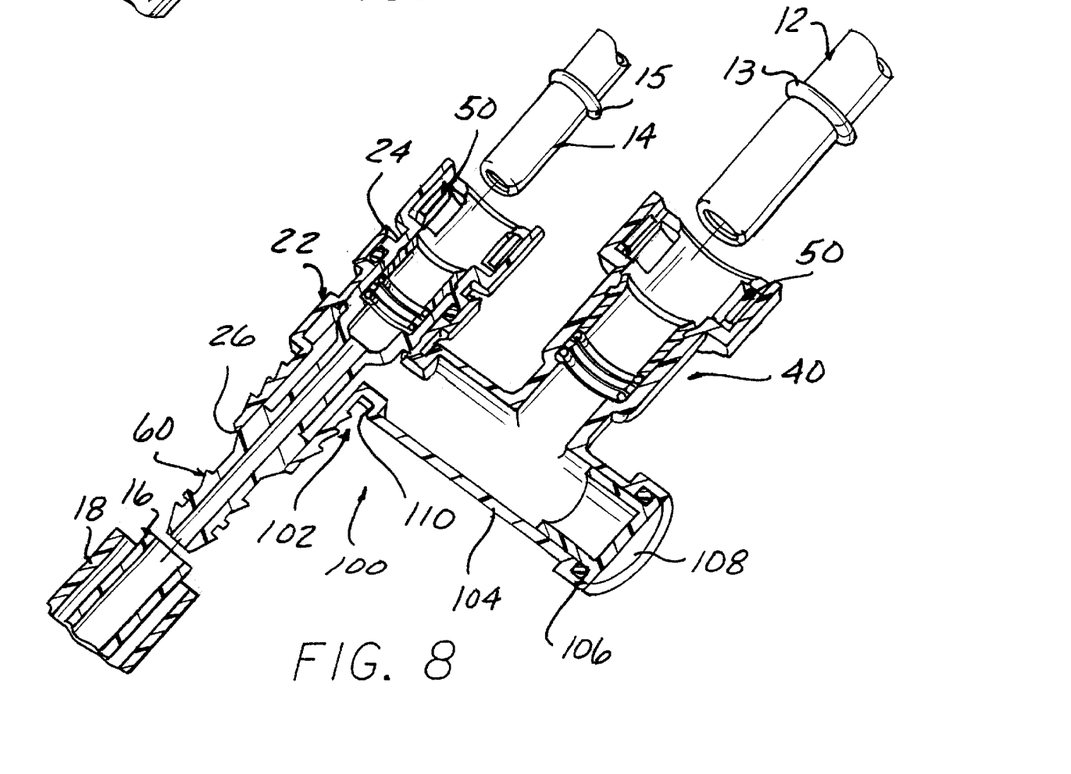
FIG. 8 is a cross-sectional view through the coaxial quick connect shown in FIG. 7.

Referring now to FIGS. 7 and 8, there is depicted another aspect of the coaxial quick connect according to the present invention. This aspect of the coaxial quick connect 100 is essentially the same as the quick connect 10 described above and shown in FIGS. 1–3. The housing 102 of the quick connect 100 includes the first tubular portion 22, which receives the insert 60 and retainer 50 as described above. The second tubular portion 40 is also part of the housing 102. However, in this aspect of the quick connect 100, the second tubular portion 40 is disposed substantially parallel with the first tubular portion 22 and is connected in internal fluid flow communication with the bores extending through the first tubular portion 22 and a tubular extension 104.

The tubular extension 104 is hollow and has a first end 106 which receives a close off cap 108. Although the first end 106 could be closed by an integrally molded wall, the cap 108 provides an auxiliary port for connection to other conduits or members. The second tubular portion 40 is connected to the tubular extension 104 at an intermediate location between the first end 106 and an opposed second end 110. The second end 110 interconnects with the first tubular portion 22 intermediate the first and second ends 24 and 26 of the first tubular portion 22.

The operation of the quick connect 100 is the same as the quick connect 10 described above in that the first and second conduits 12 and 14 are fluidically coupled to coaxially disposed third and fourth conduits 18 and 16, respectively, via the insert 60 in the first tubular portion 22 of the housing 102.

Figure 9:
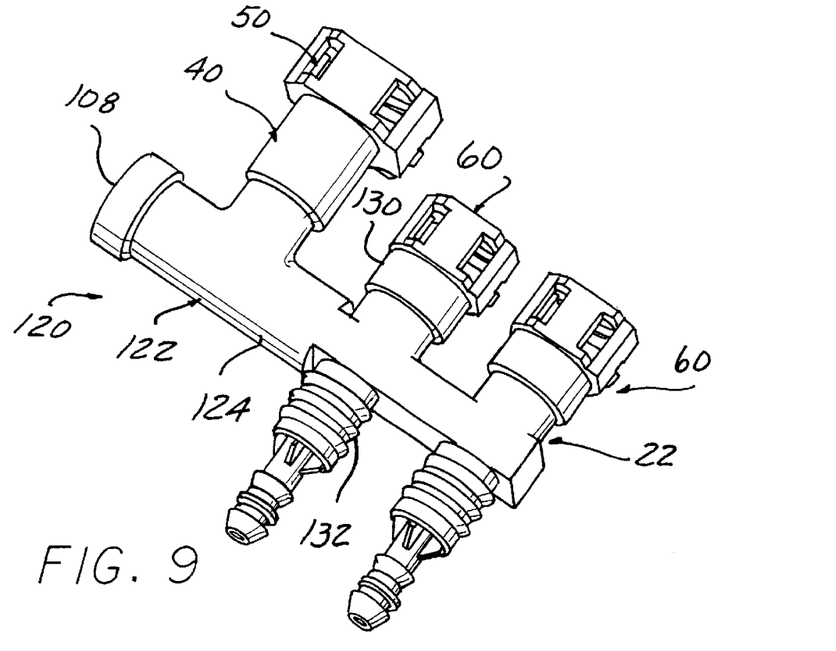
FIG. 9 is an exploded, perspective view of yet another aspect of an assembled coaxial quick connect according to the present invention.
Figure 10:
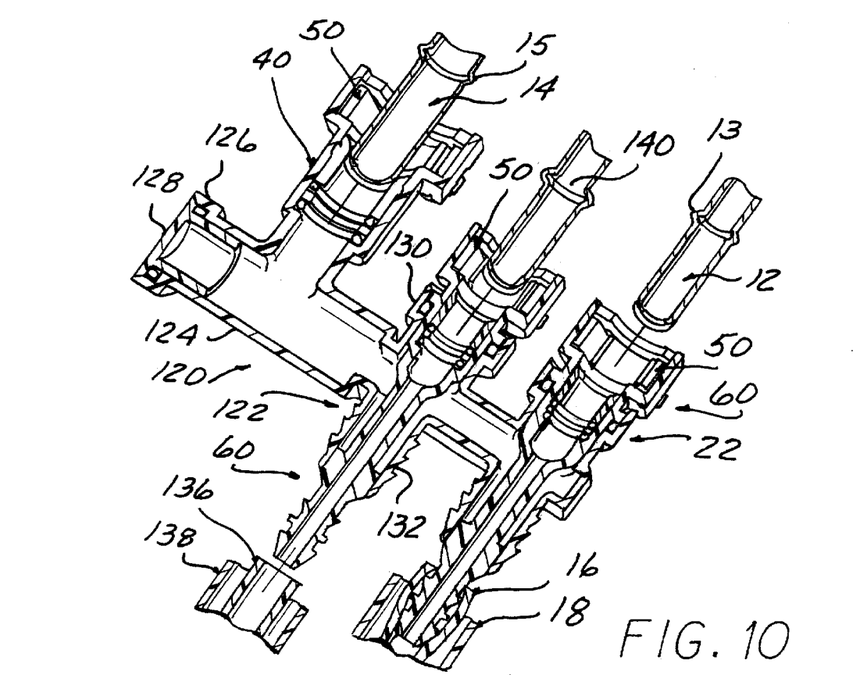
FIG. 10 is a cross-sectional view through the coaxial quick connect shown in FIG. 9.

Referring now to FIGS. 9 and 10, there is depicted yet another aspect of a coaxial quick connect 120 according to the present invention. The quick connect 120 shown in FIGS. 9 and 10 shares features of both quick connects 10 and 100 described above and shown in FIGS. 1 and 8, for example. Specifically, the quick connect 120 includes a housing 122, the first tubular portion 22 and the second tubular portion 40 disposed at opposite ends and interconnected by an elongated tubular extension 124. An end 126 of the extension 124 is sealingly closed by a cap 128 or by an integral molded end wall as shown for the opposite end of the tubular extension 124. The first tubular portion 22 receives one of the inserts 60 for sealingly coupling the first conduit 12 to the housing 122. Likewise, the second tubular portion 40 sealingly receives the second tubular conduit 14. The bore extending through the tubular extension 124 fluidically couples the bore extending through the second tubular portion 40 to the flow paths extending through the first tubular portion 22 created by the insert 60 as described above and shown in FIG. 1.

In this aspect of the invention, the housing 120 uniquely includes a second set of inlet and outlet ports formed by cylindrical sleeves 130 and 132 extending coaxially from opposite sides of the tubular extension 24 and disposed generally in parallel with the first tubular portion 22. The cylindrical sleeve 132 receives an insert 60 which, as described above, divides the port on the sleeve 132 into two distinct flow paths.

As also described above, the end of the insert 60 includes barbs for securely receiving an inner disposed conduit 136 of a pair of coaxially disposed conduits which also includes an outer conduit 138. The insert 60 receives one of the retainers 50 to sealingly couple a tube or conduit 140 to the insert 60 and establish a fluid flow path through the bore in the insert 60 to the inner conduit 136 in the same manner as described above for the coaxial quick connects 10 and 100.

In the specific application of the coaxial quick connect 120, the first conduit 12 represents a fluid flow path extending from a vehicle fuel tank with the conduit 16 to the vehicle engine. The second conduit 140 and the inner conduit 136 are part of a fuel return path from the vehicle engine to the vehicle fuel tank. The outer conduits 18 and 138 are fluidically coupled to the second conduit 14 by the housing 122 to function as a vapor flow path between the engine and a vapor collection canister, not shown.

In summary, there has been disclosed a unique coaxial quick connect which enables individual conduits, sealingly coupled to a housing, to establish separate flow paths to at least one pair of concentrically disposed, coaxial outlet flow paths through concentrically disposed conduits. In this manner, the need for a pair of discrete outlet conduits, each requiring separate quick connects, retainers, and mounting clips, are reduced to a single larger, co-axial pair of conduits requiring fewer quick connect components and mounting clips. At the same time, when the coaxial quick connect of the present invention is employed for fuel and vapor conduits in a vehicle, the coaxially disposed conduits can be arranged so that liquid fuel flows through the inner conduit and vapor through the outer conduit. In this manner, any out-permeation of vapors from the liquid fuel through the walls of the inner conduit are trapped within the outer conduit thereby minimizing potential out-permeation of fuel vapors to the atmosphere.

What is claimed is:

1. A connector for connecting first and second conduits to third and fourth coaxial conduits, the connector comprising:

a body defining first, and second and third ports;

first and second bores extending respectively from the first and second ports;

an insert fixedly mounted in the body and defining first and second outlet flow paths through the third port, the insert fluidically coupling the first port to the first outlet flow path and the second port to the second outlet flow path;

a retainer carried by the insert, the retainer engagable with the first conduit to latch the first conduit to the body in fluid communication with the first outlet flow path through the third port.

2. The connector of claim 1 wherein the insert comprises:

a tubular body having a through bore defining a flow path through the first port and the first outlet flow path to the third port of the body.

3. The connector of claim 1 wherein the insert further comprises:

a plurality of ribs carried on the insert, the ribs mounting the insert concentrically within the first bore of the body.

4. The connector of claim 1 further comprising:

the insert sealingly coupled to the body to sealingly isolate the first outlet flow path from the second outlet flow path.

5. The connector of claim 1 wherein:

at least one of the first and second conduits has a raised flange spaced from a tip end;

the retainer including first and second retainers mountable in the first and second ports of the body, respectively, to latchingly couple the first and second conduits to the body.

6. The connector of claim 5 further comprising:

a latch recess carried in the body adjacent the first and second ports; and at least one latch member carried on the first and second retainers for releasably latching each of the first and second retainers in the recess in the body in a temporary storage position allowing insertion of one of the first and second conduits therethrough into the body.

7. A connector for connecting first and second conduits to third and fourth coaxial conduits, the connector comprising:

a body defining first, and second and third ports;

first and second bores extending respectively from the first and second ports;

an insert carried in the body and defining first and second outlet flow paths through the third port, the insert fluidically coupling the first port to the first outlet flow path and the second port to the second outlet flow path;

at least one of the first and second conduits having a raised flange spaced from a tip end;

first and second retainers mountable in the first and second ports of the body to latchingly couple the first and second conduits to the body;

a latch recess carried in the body adjacent the first and second ports;

at least one latch member carried on the first and second retainers for releasably latching each retainer in the recess in the body in a body in a temporary storage position allowing insertion of one of the first and second conduits therethrough into the body;

opposed apertures formed in the body adjacent each of the first and second ports for receiving one retainer therethrough; and the latch member on the retainer extendable through the apertures externally of the body to latch the one retainer in a fully locked position with respect to the body to sealingly couple the first and second conduits to the body.

8. The connector of claim 1 further comprising:

a seal element mountable between the insert and the body for sealingly coupling the insert to the body.

9. A connector for connecting first and second conduits to third and fourth coaxial conduits, the connector comprising:

a body defining first, and second and third ports;

first and second bores extending respectively from the first and second ports;

an insert carried mounted in the body and defining first and second outlet flow paths through the third port, the insert fluidically coupling the first port to the first outlet flow path and the second port to the second outlet flow path;

at least one of the first and second conduits having a raised flange spaced from a tip end;

first and second retainers mountable in the first and second ports of the body to latchingly couple the first and second conduits to the body;

one of the first and second retainers mountable in the body; and the other of the first and second retainers mountable on the insert.

10. The connector of claim 1 further comprising:

the body including fourth and fifth ports;

another insert carried in the body and defining third and fourth outlet flow paths through the fifth port, the another insert fluidically coupling the fourth port to the third outlet flow path and the fifth port to one of the first and second ports in the body.

11. The connector of claim 10 wherein:

the first and third ports are coaxially aligned;

the fourth and fifth ports are coaxially aligned; and the first and third ports are substantially in parallel with the fourth and fifth ports.

12. A connector for connecting first and second conduits to third and fourth coaxial conduits, the connector comprising:

a body defining first, second and third ports;

first and second bores extending respectively from the first and second ports through the body;

a tubular member mounted in the body and having a first end at the first port and a second end extendable from the third port, the tubular member forming concentric flow paths through the third port of the body from the first and second ports, respectively; and a retainer carried by the insert, the retainer engagable with the first conduit to latch the first conduit to the body in fluid communication with the first outlet flow path through the third port.

13. The connector of claim 12 wherein the tubular member further comprises:

a second end extending outwardly from the third port in the body; and at least one mounting member carried on the body adjacent to the third port and at least one mounting member carried on the tubular member adjacent to the second end for concentrically receiving third and fourth fluid flow conduits.

14. The connector of claim 12 wherein the tubular member further comprises:

a body having a through bore defining a flow path from the first port formed at one end of the tubular member to the first outlet flow path at the third port of the body.

15. The connector of claim 14 further comprising:

a plurality of ribs carried on the body of the tubular member, the ribs mounting the tubular member concentrically within the first bore of the body.

16. The connector of claim 12 further comprising:

seal means mounted in the first and second bores for sealingly coupling first and second conduits to the first and second bores in the body.

* * * * *